(12) United States Patent
Tang

(10) Patent No.: US 11,455,917 B2
(45) Date of Patent: Sep. 27, 2022

(54) SPLICED DISPLAY PANEL AND SPLICED DISPLAY DEVICE

(71) Applicant: Shenzhen China Star Optoelectronics Semiconductor Display Technology Co., Ltd., Shenzhen (CN)

(72) Inventor: Shaotuo Tang, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 241 days.

(21) Appl. No.: 16/638,174

(22) PCT Filed: Jan. 8, 2020

(86) PCT No.: PCT/CN2020/070803
§ 371 (c)(1),
(2) Date: Feb. 11, 2020

(87) PCT Pub. No.: WO2021/128478
PCT Pub. Date: Jan. 7, 2021

(65) Prior Publication Data
US 2021/0407346 A1 Dec. 30, 2021

(30) Foreign Application Priority Data
Dec. 26, 2019 (CN) .......................... 201911369941.1

(51) Int. Cl.
G09F 9/302 (2006.01)
G02F 1/1333 (2006.01)
(Continued)

(52) U.S. Cl.
CPC ...... *G09F 9/3026* (2013.01); *G02F 1/133331* (2021.01); *G02F 1/133526* (2013.01); *G09F 9/35* (2013.01)

(58) Field of Classification Search
CPC .... G09F 9/3026; G09F 9/35; G02F 1/133331; G02F 1/133526
See application file for complete search history.

(56) References Cited

U.S. PATENT DOCUMENTS

2004/0041747 A1* 3/2004 Uehara ................ H04N 13/359
345/6
2011/0102302 A1* 5/2011 Watanabe ............. G06F 1/1624
345/4

(Continued)

FOREIGN PATENT DOCUMENTS

CN 2121777 U 11/1992
CN 200990174 Y 12/2007
(Continued)

*Primary Examiner* — Robert J Michaud
(74) *Attorney, Agent, or Firm* — Luedeka Neely Group, P.C.

(57) ABSTRACT

The present application provides a spliced display panel. The spliced display panel includes a panel body and a cover plate, wherein the panel body includes at least a splicing seam, the cover plate includes a cover plate body and a lens assembly connected to the cover plate body, an orthographic projection of the lens assembly on a plane where the panel body is located covers at least the splicing seam, and the lens assembly includes a first convex lens and a second convex lens.

20 Claims, 1 Drawing Sheet

(51) Int. Cl.
    *G02F 1/1335*    (2006.01)
    *G09F 9/35*     (2006.01)

(56) References Cited

U.S. PATENT DOCUMENTS

| | | |
|---|---|---|
| 2017/0168335 A1 | 6/2017 | Meng |
| 2018/0039069 A1 | 2/2018 | Huang et al. |
| 2018/0246259 A1 | 8/2018 | Du |
| 2019/0207165 A1 | 7/2019 | Pan et al. |
| 2019/0251963 A1 | 8/2019 | Li et al. |
| 2020/0089095 A1* | 3/2020 | Lin .................. G03B 21/2013 |

FOREIGN PATENT DOCUMENTS

| | | |
|---|---|---|
| CN | 201387696 Y | 1/2010 |
| CN | 202549182 U | 11/2012 |
| CN | 203732842 U | 7/2014 |
| CN | 104076506 A | 10/2014 |
| CN | 104409020 A | 3/2015 |
| CN | 204360012 U | 5/2015 |
| CN | 104749762 A | 7/2015 |
| CN | 104950504 A | 9/2015 |
| CN | 105448196 A | 3/2016 |
| CN | 106094206 A | 11/2016 |
| CN | 106652807 A | 5/2017 |
| CN | 107221257 A | 9/2017 |
| CN | 108198844 A | 6/2018 |
| CN | 108335636 A | 7/2018 |
| CN | 108564894 A | 9/2018 |
| CN | 109532068 A | 3/2019 |
| JP | 2001013878 A | 1/2001 |
| JP | 2002247455 A | 8/2002 |
| KR | 20080076555 A | 8/2008 |

* cited by examiner

SPLICED DISPLAY PANEL AND SPLICED DISPLAY DEVICE

BACKGROUND OF INVENTION

Field of Invention

The present application relates to a field of display technology, and in particular, to a spliced display panel and a spliced display device.

Description of Prior Art

In order to realize a large-sized display of liquid crystal display (LCD), technology of liquid crystal display (LCD) splicing wall is developing rapidly. With continuous development of the technology of liquid crystal display splicing wall, a splicing seam gradually is decreased, and in addition to minimizing the physical splicing seam of the LCD splicing wall itself, other seam elimination technologies are also booming under the stimulation of the market.

In an existing seam elimination structure, a distance between a cover plate and a display screen is relatively large, which results in a poor alignment assembly effect of the cover plate and the display screen.

SUMMARY OF INVENTION

The present application provides a spliced display panel and a spliced display device to solve the technical problem of poor alignment assembly effect of a cover plate and a display screen.

The present application provides a spliced display panel, which includes:

a panel body including at least one splicing seam; and a cover plate disposed on a light-exiting side of the panel body, and symmetrically arranged along the splicing seam, wherein the cover plate includes a cover plate body and a lens assembly connected to the cover plate body, the lens assembly is integrally formed with the cover plate body, and the lens assembly is fixedly connected to another adjacent lens assembly, wherein an orthographic projection of the lens assembly on a plane where the panel body is located covers at least the splicing seam, and wherein the lens assembly includes a first convex lens and a second convex lens, the first convex lens is disposed on a side of the lens assembly close to the panel body, and the second convex lens is disposed on a side of the lens assembly away from the panel body.

In the spliced display panel of the present application, the first convex lens includes a first light incident surface and a first light-exiting surface; and wherein the first convex lens is a plano-convex lens, the first light-incident surface is a plane, the first light-exiting surface is a convex surface, and a thickness of the first convex lens is decreased progressively from an end away from the splicing seam to an end close to the splicing seam.

In the spliced display panel of the present application, the second convex lens includes a second light incident surface and a second light-exiting surface; and wherein the second convex lens is a meniscus lens, the second light incident surface is a concave surface, and the second light-exiting surface is a convex surface.

In the spliced display panel of the present application, an end of the second convex lens close to the splicing seam is fixedly connected to the first convex lens.

In the spliced display panel of the present application, the second convex lens includes a second light incident surface and a second light-exiting surface; and wherein the second convex lens is a lenticular lens, and the second light incident surface and the second light-exiting surface are both convex surfaces.

In the spliced display panel of the present application, an end of the second convex lens away from the splicing seam is fixedly connected to the first convex lens.

In the spliced display panel of the present application, the lens assembly is screwed to the panel body.

The present application also provides a spliced display panel, which includes:

a panel body including at least one splicing seam; and a cover plate disposed on a light-exiting side of the panel body, and symmetrically arranged along the splicing seam, wherein the cover plate includes a cover plate body and a lens assembly connected to the cover plate body, and an orthographic projection of the lens assembly on a plane where the panel body is located covers at least the splicing seam, and wherein the lens assembly includes a first convex lens and a second convex lens, the first convex lens is disposed on a side of the lens assembly close to the panel body, and the second convex lens is disposed on a side of the lens assembly away from the panel body.

In the spliced display panel of the present application, the first convex lens includes a first light incident surface and a first light-exiting surface; and wherein the first convex lens is a plano-convex lens, the first light-incident surface is a plane, the first light-exiting surface is a convex surface, and a thickness of the first convex lens is decreased progressively from an end away from the splicing seam to an end close to the splicing seam.

In the spliced display panel of the present application, the second convex lens includes a second light incident surface and a second light-exiting surface; and wherein the second convex lens is a meniscus lens, the second light incident surface is a concave surface, and the second light-exiting surface is a convex surface.

In the spliced display panel of the present application, an end of the second convex lens close to the splicing seam is fixedly connected to the first convex lens.

In the spliced display panel of the present application, the second convex lens includes a second light incident surface and a second light-exiting surface; and wherein the second convex lens is a lenticular lens, and the second light incident surface and the second light-exiting surface are both convex surfaces.

In the spliced display panel of the present application, an end of the second convex lens away from the splicing seam is fixedly connected to the first convex lens.

In the spliced display panel of the present application, the lens assembly is fixedly connected to another adjacent lens assembly.

In the spliced display panel of the present application, the lens assembly is integrally formed with the cover plate body.

In the spliced display panel of the present application, the lens assembly is screwed to the panel body.

The present application also provides a spliced display device, which includes the foregoing spliced display panel, and the spliced display panel includes:

a panel body including at least one splicing seam; and a cover plate disposed on a light-exiting side of the panel body, and symmetrically arranged along the splicing seam, wherein the cover plate includes a cover plate body and a lens assembly connected to the cover plate body, and an orthographic projection of the lens assembly on a plane where the panel body is located covers at least the splicing seam, and wherein the lens assembly includes a first convex lens and a second convex lens, the first convex lens is disposed on a side of the lens assembly close to the panel body, and the second convex lens is disposed on a side of the lens assembly away from the panel body.

In the spliced display device of the present application, the first convex lens includes a first light incident surface and a first light-exiting surface; and wherein the first convex lens is a plano-convex lens, the first light-incident surface is a plane, the first light-exiting surface is a convex surface, and a thickness of the first convex lens is decreased progressively from an end away from the splicing seam to an end close to the splicing seam.

In the spliced display device of the present application, the second convex lens includes a second light incident surface and a second light-exiting surface; and wherein the second convex lens is a meniscus lens, the second light incident surface is a concave surface, and the second light-exiting surface is a convex surface.

In the spliced display device of the present application, an end of the second convex lens close to the splicing seam is fixedly connected to the first convex lens.

Compared with the spliced display panel of the prior art, the spliced display panel of the present application is designed to provide an assembly structure of a first convex lens and a second convex lens at a portion of the cover plate located at an edge of the splicing seam. When light emitted by the panel body passes through the first convex lens and the second convex lens in sequence, a magnification of an image at the edge of the splicing seam is increased by convergence of light, and a distance between the cover plate and the panel body can be reduced when the display panel is assembled, thereby improving the alignment assembly effect of the cover plate and the panel body.

BRIEF DESCRIPTION OF DRAWINGS

In order to more clearly illustrate the embodiments or the technical solutions of the existing art, the drawings illustrating the embodiments or the existing art will be briefly described below. Obviously, the drawings in the following description merely illustrate some embodiments of the present invention. Other drawings may also be obtained by those skilled in the art according to these figures without paying creative work.

DETAILED DESCRIPTION OF PREFERRED EMBODIMENTS

The technical solutions in the embodiments of the present application will be clearly and completely described in the following with reference to the accompanying drawings in the embodiments. It is apparent that the described embodiments are only a part of the embodiments of the present application, and not all of them. All other embodiments obtained by a person skilled in the art based on the embodiments of the present application without creative efforts are within the scope of the present application.

It should be noted that the panel body in the present application may include one or more splicing seams. The following embodiments of the present application only take the panel body including one splicing seam as an example for description, but the present invention is not particularly limited thereto.

Figure 1:
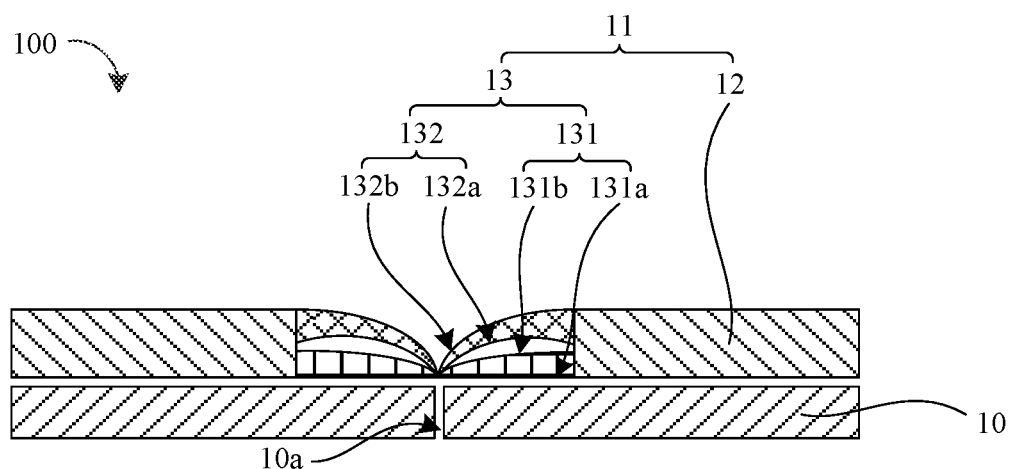
FIG. 1 is a schematic structural diagram of a spliced display panel provided by a first embodiment of the present application.

Referring to FIG. 1, FIG. 1 is a schematic structural diagram of a spliced display panel provided by a first embodiment of the present application.

The spliced display panel 100 provided by the first embodiment of the present application includes a panel body 10 and a cover plate 11. The panel body 10 includes at least one splicing seam 10a. The cover plate 11 is disposed on the light-exiting side of the panel body 10. The cover plate 11 is arranged symmetrically along the splicing seam 10a. The cover plate 11 includes a cover plate body 12 and a lens assembly 13 connected to the cover plate body 12. An orthographic projection of the lens assembly 13 on a plane where the panel body 10 is located covers at least the splicing seam 10a. The lens assembly 13 includes a first convex lens 131 and a second convex lens 132. The first convex lens 131 is provided on a side of the lens assembly 13 close to the panel body 10. The second convex lens 132 is disposed on a side of the lens assembly 13 away from the panel body 10.

Therefore, the spliced display panel 100 provided by the first embodiment of the present application is designed to provide an assembly structure of a first convex lens 131 and a second convex lens 132 at a portion of the cover plate 11 located at an edge of the splicing seam 10a. When light emitted by the panel body 10 passes through the first convex lens 131 and the second convex lens 132 in sequence, a magnification of an image at the edge of the splicing seam 10a is increased by convergence of light, and a distance between the cover plate 11 and the panel body 10 can be reduced when the display panel is assembled, thereby improving the alignment assembly effect of the cover plate 11 and the panel body 10.

It can be understood that, in the first embodiment of the present application, the orthographic projections of the lens assemblies 13 located on opposite sides of the splicing seam 10a on the plane where the panel body 10 is located completely cover the splicing seam 10a. By setting the adjacent lens assemblies 13 to completely cover the splicing seam 10a, such a design allows the display screen to perform normal screen display at the splicing seam 10a, so as to achieve seamless assembly of the image at an edge of the display screen.

Specifically, the lens assembly 13 is made of an optically transparent material. Optionally, the optically transparent material is an optical resin, an acrylic or other optically transparent material.

Further, the lens assembly 13 is prepared by injection molding. Specifically, the lens assembly 13 is prepared by an injection molding process. The lens assembly 13 and the panel body 10 may be connected by screwing or bonded by an optical glue.

Further, the lens assembly 13 is fixedly connected to the cover plate body 12.

In the first embodiment of the present application, the lens assembly 13 is integrally formed with the cover plate body 12, and such a setting can simplify a manufacturing process of the cover plate, thereby saving production costs.

In some embodiments, the lens assembly 13 is separately connected to the cover plate body 12. For example, during the manufacturing process of the large-sized spliced display panel, the lens assembly 13 may be bonded to the cover plate body 12 by an optical glue, so as to facilitate the alignment assembly of the cover plate 11 and the panel body 10 in the subsequent assembly processes. In addition, a connection method of the lens assembly 13 and the cover plate body 12 can also be selected according to actual application requirements, which is not particularly limited in the present application.

Further, the adjacent lens assemblies 13 are fixedly connected to each other. Specifically, the adjacent lens assemblies 13 may be bonded to each other by the optical glue or fixedly connected to each other by a screw. A specific connection method may be selected according to actual process conditions, and details are not described herein, for brevity.

It can be understood that the method of manufacturing the spliced display panel 100 according to the first embodiment of the present application is as follows: first, splicing two display panels to form a panel body 10 having a splicing seam 10a, then fixing the cover plate 11 on the panel body 10 to form the spliced display panel 100. An orthographic projection of the lens assembly 13 on a plane where the panel body 10 is located completely covers the splicing seam 10a.

Specifically, the first convex lens 131 includes a first light incident surface 131a and a first light-exiting surface 131b.

Optionally, the first convex lens 131 is a plano-convex lens. The first light incident surface 131a is a plane. The first light-exiting surface 131b is a convex surface. In some embodiments, the first convex lens 131 may also be a lenticular lens or a meniscus lens, which is not particularly limited in the present application.

Further, a thickness of the first convex lens 131 is decreased progressively from an end away from the splicing seam 10a to an end close to the splicing seam 10a.

When light enters the first convex lens 131 from the first light incident surface 131a, the light incident from the edge of the splicing seam 10a will converge toward the splicing seam 10a, thereby improving the screen display effect at the splicing seam 10a.

Specifically, the second convex lens 132 includes a second light incident surface 132 a and a second light-exiting surface 132 b.

Optionally, the second convex lens 132 is a meniscus lens, a plano-convex lens, or a lenticular lens.

In the first embodiment of the present application, the second convex lens 132 is a meniscus lens, the second light incident surface 132a is a concave surface, and the second light-exiting surface 132b is convex.

It can be understood that when the light transmitted through the first convex lens 131 enters the second convex lens 132 from the second light incident surface 132a, the light incident from the edge of the splicing seam 10a diverges onto the second light-exiting surface 132b, and then converges to the splicing seam 10a again through the second light-exiting surface 132b. As a result, the light incident from the edge of the splicing seam 10a converges twice, so that the light is gathered, thereby increasing a magnification of an image at the edge of the splicing seam 10a, and the purpose of visually eliminating the splicing seam is achieved.

In the first embodiment of the present application, an end of the second convex lens 132 close to the splicing seam 10a is fixedly connected to the first convex lens 131.

In some embodiments, an end of the second convex lens 132 away from the splicing seam 10a is fixedly connected to the first convex lens 131, or opposite ends of the second convex lens 132 are fixedly connected to the first convex lens 131, respectively.

The spliced display panel 100 provided by the first embodiment of the present application is designed to provide an assembly structure of a plano-convex lens and a meniscus lens at a portion of the cover plate 11 located at an edge of the splicing seam 10a. When light emitted by the panel body 10 passes through the plano-convex lens and the meniscus lens in sequence, a magnification of an image at the edge of the splicing seam 10a is increased by convergence of light, and a distance between the cover plate 11 and the panel body 10 can be reduced when the display panel is assembled, thereby improving the alignment assembly effect of the cover plate 11 and the panel body 10.

Figure 2:
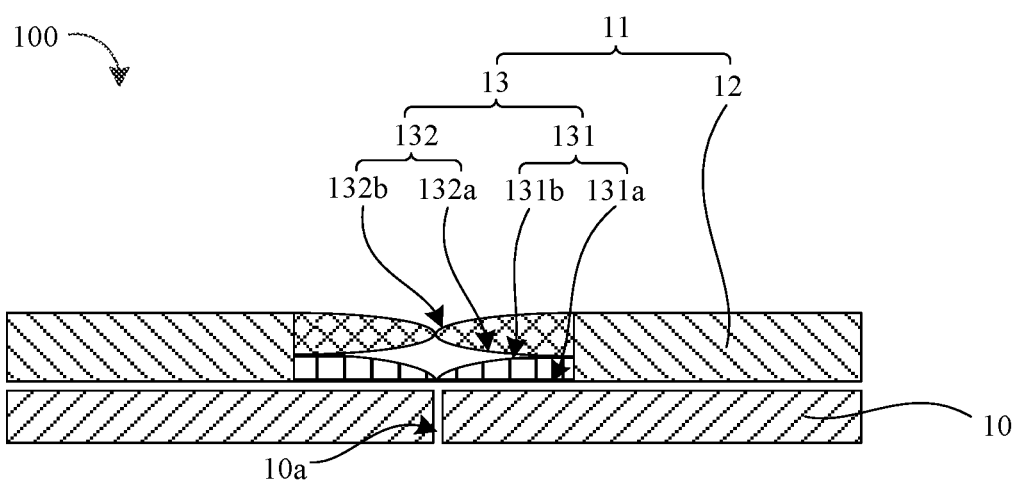
FIG. 2 is a schematic structural diagram of a spliced display panel provided by a second embodiment of the present application.

Referring to FIG. 2, FIG. 2 is a schematic structural diagram of a spliced display panel provided by a second embodiment of the present application. The second embodiment of the present application is different from the first embodiment in that the second convex lens 132 is a lenticular lens.

Specifically, the second convex lens 132 includes a second light incident surface 132a and a second light-exiting surface 132b. Both the second light incident surface 132a and the second light-exiting surface 132b are convex surfaces.

Further, a thickness of the second convex lens 132 is decreased progressively from an end away from the splicing seam 10a to an end close to the splicing seam 10a.

It can be understood that when the light transmitted through the first convex lens 131 enters the second convex lens 132 from the second light incident surface 132a, the light incident from the edge of the splicing seam 10a converges onto the second light-exiting surface 132b, and then converges onto the splicing seam 10a again through the second light-exiting surface 132b. As a result, the light incident from the edge of the splicing seam 10a converges twice, so that the light is collected, thereby increasing a magnification of an image at the edge of the splicing seam 10a, and the purpose of visually eliminating the splicing seam is achieved.

Optionally, an end of the second convex lens 132 away from the splicing seam 10a is fixedly connected to the second convex lens 132.

The spliced display panel 100 provided by the second embodiment of the present application is designed to provide an assembly structure of a plano-convex lens and a lenticular lens at a portion of the cover plate 11 located at an edge of the splicing seam 10a. When light emitted by the panel body 10 passes through the plano-convex lens and the lenticular lens in sequence, a magnification of an image at the edge of the splicing seam 10a is increased by convergence of light, and a distance between the cover plate 11 and the panel body 10 can be reduced when the display panel is assembled, thereby improving the alignment assembly effect of the cover plate 11 and the panel body 10.

The implementation of the present application have been described in detail above. Specific examples are used in this document to explain the principles and implementation of the present invention. The descriptions of the above embodiments are only for understanding the method of the present invention and its core idea; Meanwhile, for those skilled in the art, according to the idea of the present invention, there will be changes in the specific implementation and application scope. In summary, the content of this specification should not be construed as a limitation on the present invention.

What is claimed is:

1. A spliced display panel, comprising:
   a panel body comprising at least one splicing seam; and
   a cover plate disposed on a light-exiting side of the panel body, and symmetrically arranged along the splicing seam, wherein the cover plate comprises a cover plate body and a lens assembly connected to the cover plate body, the lens assembly is integrally formed with the cover plate body, and the lens assembly is fixedly connected to another adjacent lens assembly, wherein an orthographic projection of the lens assembly on a plane where the panel body is located covers at least the splicing seam,
   wherein the lens assembly comprises a first convex lens and a second convex lens, a shape of the first convex lens is different from a shape of the second convex lens, the first convex lens is disposed on a side of the lens assembly close to the panel body, and the second convex lens is disposed on a side of the lens assembly away from the panel body;
   wherein the first convex lens comprises a first light incident surface and a first light-exiting surface, and the second convex lens comprises a second light incident surface and a second light-exiting surface; and
   wherein the first convex lens is configured to converge light entering the first convex lens from the first light incident surface at an edge of the splicing seam toward the splicing seam, and the second convex lens is configured to converge light transmitting through the first convex lens and entering the second convex lens from the second light incident surface at the edge of the splicing seam toward the splicing seam through the second light-exiting surface.

2. The spliced display panel according to claim 1, wherein the first convex lens is a plano-convex lens, the first light-incident surface is a plane, the first light-emitting surface is a convex surface, and a thickness of the first convex lens is decreased progressively from an end away from the splicing seam to an end close to the splicing seam.

3. The spliced display panel according to claim 2, wherein the second convex lens is a meniscus lens, the second light incident surface is a concave surface, and the second light-exiting surface is a convex surface.

4. The spliced display panel according to claim 3, wherein an end of the second convex lens close to the splicing seam is fixedly connected to the first convex lens.

5. The spliced display panel according to claim 2, wherein the second convex lens comprises a second light incident surface and a second light-exiting surface; and
   wherein the second convex lens is a lenticular lens, and the second light incident surface and the second light-exiting surface are both convex surfaces.

6. The spliced display panel according to claim 5, wherein an end of the second convex lens away from the splicing seam is fixedly connected to the first convex lens.

7. The spliced display panel according to claim 1, wherein the lens assembly is screwed to the panel body.

8. A spliced display panel, comprising:
   a panel body comprising at least one splicing seam; and
   a cover plate disposed on a light-exiting side of the panel body, and symmetrically arranged along the splicing seam, wherein the cover plate comprises a cover plate body and a lens assembly connected to the cover plate body, and an orthographic projection of the lens assembly on a plane where the panel body is located covers at least the splicing seam, and
   wherein the lens assembly comprises a first convex lens and a second convex lens, a shape of the first convex lens is different from a shape of the second convex lens, the first convex lens is disposed on a side of the lens assembly close to the panel body, and the second convex lens is disposed on a side of the lens assembly away from the panel body;
   wherein the first convex lens comprises a first light incident surface and a first light-exiting surface, and the second convex lens comprises a second light incident surface and a second light- exiting surface; and
   wherein the first convex lens is configured to converge light entering the first convex lens from the first light incident surface at an edge of the splicing seam toward the splicing seam, and the second convex lens is configured to converge light transmitting through the first convex lens and entering the second convex lens from the second light incident surface at the edge of the splicing seam toward the splicing seam through the second light-exiting surface.

9. The spliced display panel according to claim 8, wherein the first convex lens is a plano-convex lens, the first light-incident surface is a plane, the first light-emitting surface is a convex surface, and a thickness of the first convex lens is decreased progressively from an end away from the splicing seam to an end close to the splicing seam.

10. The spliced display panel according to claim 9, wherein the second convex lens is a meniscus lens, the second light incident surface is a concave surface, and the second light-exiting surface is a convex surface.

11. The spliced display panel according to claim 10, wherein an end of the second convex lens close to the splicing seam is fixedly connected to the first convex lens.

12. The spliced display panel according to claim 9, wherein the second convex lens comprises a second light incident surface and a second light-exiting surface; and
   wherein the second convex lens is a lenticular lens, and the second light incident surface and the second light-exiting surface are both convex surfaces.

13. The spliced display panel according to claim 12, wherein an end of the second convex lens away from the splicing seam is fixedly connected to the first convex lens.

14. The spliced display panel according to claim 8, wherein the lens assembly is fixedly connected to another adjacent lens assembly.

15. The spliced display panel according to claim 8, wherein the lens assembly is integrally formed with the cover plate body.

16. The spliced display panel according to claim 8, wherein the lens assembly is screwed to the panel body.

17. A spliced display device, comprising a spliced display panel, the spliced display panel comprising:
   a panel body comprising at least one splicing seam; and
   a cover plate disposed on a light-exiting side of the panel body, and symmetrically arranged along the splicing seam, wherein the cover plate comprises a cover plate body and a lens assembly connected to the cover plate body, and an orthographic projection of the lens assembly on a plane where the panel body is located covers at least the splicing seam, and
   wherein the lens assembly comprises a first convex lens and a second convex lens, a shape of the first convex lens is different from a shape of the second convex lens, the first convex lens is disposed on a side of the lens assembly close to the panel body, and the second convex lens is disposed on a side of the lens assembly away from the panel body;

wherein the first convex lens comprises a first light incident surface and a first light-exiting surface, and the second convex lens comprises a second light incident surface and a second light- exiting surface; and wherein the first convex lens is configured to converge light entering the first convex lens from the first light incident surface at an edge of the splicing seam toward the splicing seam, and the second convex lens is configured to converge light transmitting through the first convex lens and entering the second convex lens from the second light incident surface at the edge of the splicing seam toward the splicing seam through the second light-exiting surface.

18. The spliced display device according to claim 17, wherein the first convex lens is a plano-convex lens, the first light-incident surface is a plane, the first light-emitting surface is a convex surface, and a thickness of the first convex lens is decreased progressively from an end away from the splicing seam to an end close to the splicing seam.

19. The spliced display device according to claim 18, wherein the second convex lens is a meniscus lens, the second light incident surface is a concave surface, and the second light-exiting surface is a convex surface.

20. The spliced display device according to claim 19, wherein an end of the second convex lens close to the splicing seam is fixedly connected to the first convex lens.

\* \* \* \* \*